United States Patent
Takemura et al.

(10) Patent No.: US 8,548,755 B2
(45) Date of Patent: Oct. 1, 2013

(54) FLOW RATE MEASUREMENT DEVICE

(75) Inventors: Koichi Takemura, Nara (JP); Fumikazu Shiba, Nara (JP); Daisuke Bessho, Shiga (JP)

(73) Assignee: Panasonic Corporation, Osaka (JP)

( * ) Notice: Subject to any disclaimer, the term of this patent is extended or adjusted under 35 U.S.C. 154(b) by 353 days.

(21) Appl. No.: 13/139,425

(22) PCT Filed: Dec. 25, 2009

(86) PCT No.: PCT/JP2009/007231
§ 371 (c)(1),
(2), (4) Date: Jun. 13, 2011

(87) PCT Pub. No.: WO2010/079568
PCT Pub. Date: Jul. 15, 2010

(65) Prior Publication Data
US 2011/0246098 A1    Oct. 6, 2011

(30) Foreign Application Priority Data

Jan. 6, 2009 (JP) ................................. 2009-000506

(51) Int. Cl.
*G01F 1/66* (2006.01)

(52) U.S. Cl.
USPC ................. 702/48; 702/45; 702/50; 702/98; 702/100; 702/104; 73/597; 73/24.01; 73/24.02; 73/24.03; 73/24.05; 73/24.06; 73/861.27; 73/861.28; 73/861.29

(58) Field of Classification Search
USPC ................. 702/45, 48, 50, 98, 100, 103, 104, 702/105, 113; 73/597, 602, 24.01, 24.02, 73/24.03, 24.05, 24.06, 32 A, 861.18, 861.25, 73/861.26, 861.27, 861.29; 324/76.21, 76.33
See application file for complete search history.

(56) References Cited

U.S. PATENT DOCUMENTS 5,369,979 A * 12/1994 Aylsworth et al. ........... 73/24.01
5,452,621 A * 9/1995 Aylesworth et al. ....... 73/864.81

(Continued)

FOREIGN PATENT DOCUMENTS

CN    1350634 A    5/2002
CN    101223420 A    7/2008

(Continued)

OTHER PUBLICATIONS

Extended European Search Report for European Application No. 09837458.0, dated Apr. 10, 2012, 7 pages.

(Continued)

*Primary Examiner* — Carol S Tsai
(74) *Attorney, Agent, or Firm* — Brinks Hofer Gilson & Lione (57) ABSTRACT

Switching a transmitting and receiving direction of two transducers (2,3) in the forward and the reverse direction, a time differential memory part (17b) storing a propagation time differential every K times a unit measurement process being executed, the propagation time differential being a differential between a propagation time of the ultrasonic wave signal in a forward direction and in a reverse direction, a flow rate calculating part (15) calculating a flow rate of a passing fluid based on a lump sum of propagation times in both the forward and the reverse directions obtained at least every K times of a unit measurement process being executed, an estimating part (18) estimating a change in a momentary flow rate of the fluid based on the time differential obtained every K times of the unit measurement process being executed and storing thereof in a time differential memory part (17b), thus obtaining an accurate flow rate and detecting the change in the momentary flow rate.

4 Claims, 6 Drawing Sheets

(56) References Cited

U.S. PATENT DOCUMENTS

| | | | |
|---|---|---|---|
| 6,116,080 A * | 9/2000 | Logue et al. | 73/24.05 |
| 6,192,739 B1 * | 2/2001 | Logue et al. | 73/24.01 |
| 6,199,423 B1 * | 3/2001 | Logue et al. | 73/1.82 |
| 6,279,379 B1 * | 8/2001 | Logue et al. | 73/24.01 |
| 6,460,402 B1 * | 10/2002 | Gomm et al. | 73/24.01 |
| 6,487,916 B1 * | 12/2002 | Gomm et al. | 73/861.29 |
| 6,625,549 B1 | 9/2003 | Nawa et al. | |
| 6,634,239 B2 * | 10/2003 | Gomm et al. | 73/861.27 |
| 6,748,812 B1 | 6/2004 | Takemura et al. | |
| 7,500,403 B2 * | 3/2009 | Konzelmann et al. | 73/861.29 |
| 7,634,366 B2 | 12/2009 | Takemura et al. | |
| 2004/0267464 A1 | 12/2004 | Umekage et al. | |
| 2008/0289434 A1 | 11/2008 | Takemura et al. | |

FOREIGN PATENT DOCUMENTS

| | | |
|---|---|---|
| EP | 1193476 A1 | 4/2002 |
| EP | 1921424 A1 | 5/2008 |
| JP | 2000-146648 A | 5/2000 |
| JP | 2002-350202 A | 12/2002 |
| JP | 2004-069522 A | 3/2004 |
| JP | 2004-069532 A | 3/2004 |
| JP | 2004-144744 A | 5/2004 |

OTHER PUBLICATIONS

International Search Report for International Application No. PCT/JP2009/007231, dated Jan. 26, 2010, 2 pages.

* cited by examiner

FLOW RATE MEASUREMENT DEVICE

TECHNICAL FIELD

This invention relates to a flow rate measuring device measuring a propagation time of an ultrasonic wave signal, therewith detecting a flow velocity, and then determining a flow rate of a fluid with the detected flow velocity.

BACKGROUND ART

As an ordinary flow rate measuring device of this kind, a device utilizing a sing-around method is introduced, in which a signal transmission and reception are repeated by two transducers multiple times for enhancing measuring resolution. This type of flow rate measuring device applied to a home gas meter will be explained as an example by using FIG. 7.

Figure 7:
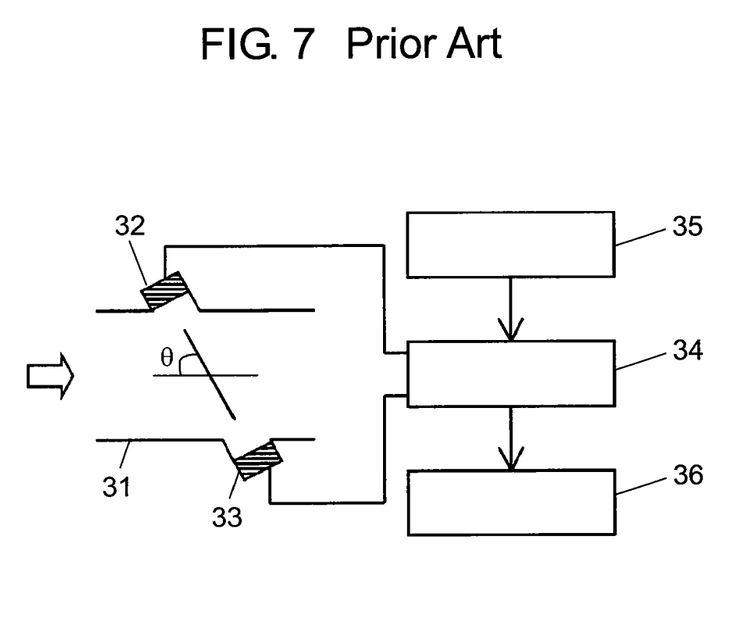
FIG. 7 is a block diagram of a conventional flow rate measuring device.

FIG. 7 is a block diagram of a conventional flow rate measuring device utilizing the sing-around method. As in FIG. 7, the device is composed of first transducer 32 for transmitting an ultrasonic wave signal and second transducer 33 for receiving the ultrasonic signal placed in a middle of fluid pipe 31 and oppositely facing a flowing direction. The flow rate measuring device is also composed of measuring part 34 for measuring a propagation time of the ultrasonic signal with transducers 32 and 33, controlling part 35 for controlling measuring part 34, and calculating part 36 determining a flow rate of fluid based on measurement of measuring part 34.

In FIG. 7, assume an acoustic sound velocity is C, a flow velocity is v, a distance between the two transducers is L, and an angle between a propagation direction and a flow direction is θ. When first transducer 32 at an upper stream of the fluid pipe transmits an ultrasonic signal and second transducer 33 at a lower stream receives the signal, assume a propagation time of the signal is t1, and a propagation time in a reverse direction t2, then t1 and t2 are each expressed by the following formula.

$$t1 = L/(C + v \cos \theta) \quad (1)$$

$$t2 = L/(C - v \cos \theta) \quad (2)$$

Formula (1) and (2) may be transformed into the formula (3), obtaining flow velocity v.

$$v = L(1/t1 - 1/t2)/2 \cos \theta \quad (3)$$

Multiplying v obtained in (3) by a cross section S of fluid pipe 32, a flow rate of the fluid is obtained.

The items in the parenthesis in formula (3) may be transformed into the following formula (4)

$$(t2 - t1)/t1 t2 \quad (4)$$

Generally, in this kind of flow rate measuring device, flow velocity v is far smaller than an acoustic sound velocity C. It is also known that acoustic sound velocity C is approximately expressed by a linear function of temperature. However, assuming that there is no abrupt change in temperature in a short period of time, acoustic velocity C may be considered to be a constant value. The denominator in formula (4) is therefore essentially constant regardless of change in flow velocity, meaning the item in the numerator is almost proportioned to the flow velocity. So, in order to obtain an accurate flow velocity v, the propagation time difference between the two ultrasonic waves needs to be measured accurately. As flow velocity becomes slower, much finer time difference between the two propagation times needs to be measured. So, for measuring a single phenomenon, measuring part 34 must have a very high time resolution, such as in ns order. Such a high time resolution is hardly obtained. Even if it is obtained, power consumption is inevitably increased for raising the resolution. For that reason, ultrasonic wave signal transmission is repeated and measuring part 34 measures time required for the repeated measurement. By averaging the values, a necessary time resolution is realized. Assume a time resolution of measuring part 34 is TA and a repetition times is M, a measuring resolution of propagation time is obtained by TA/M as long as measuring part 34 is continually operates the repeated measurement, This type of flow rate measuring device realizes a high precision measurement when a pressure inside the path of fluid is stabilized. But, when the device is applied to a gas meter measuring a flow rate of household gas, it faces an inherent problem called "pulsation". This phenomenon is seen in a gas-engine driven air-conditioner or a GHP (gas heat pump), for example, where a pressure inside a gas pipe around the equipment is varied synchronized with rotation of the engine. If the pulsation occurs, gas flows moving inside the pipe synchronized with the change in pressure even when the appliance is not used, outputting a measurement value as if the gas is flown inside.

For controlling the adverse effect of this phenomenon, a method is proposed such as in Unexamined Japanese Patent Publication No. 2002-35202. In this method, repetition times M of measurement is controlled to a minimum possible level while maintaining a certain measuring precision. With this condition, a measurement interval is shortened and measurement is conducted frequently for relatively a long time. The flow rate is calculated using the consecutive measurements. By making a measurement interval sufficiently shorter than a cycle of the pressure change, a changing phase status in a flow velocity waveform is evenly captured. So, by averaging the consecutive measurement, a net flow velocity (flow rate) eliminated of a varying component may be obtained.

Figure 8:
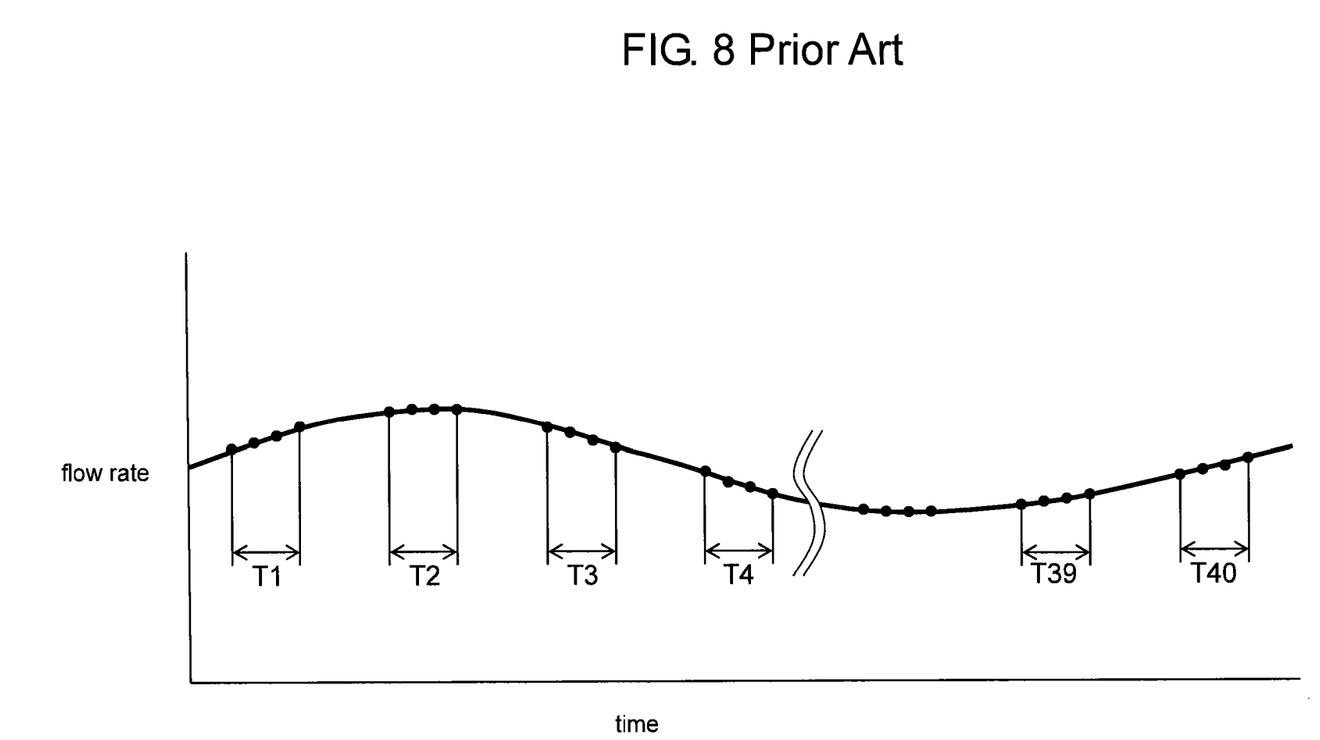
FIG. 8 is a time chart explaining an operation of the conventional flow rate measuring device.

FIG. 8 an example using the method, in which repetition times M is 4. In FIG. 8, a time T1 is a propagation time from an upstream to a downstream and a time T2 is a propagation time from the downstream to the upstream. Switching the transmitting and receiving direction, measurement is continued 20 times each, total T40. A sum total of each propagation time is obtained and averaged to determine a propagation time in each direction, therewith a flow rate is determined. With this method, the flow velocity is averaged whether the pulsation exists or not, therewith an accurate flow rate is obtained. For this reason, a proposal using this method is increasing in number recent years.

A home gas meter is equipped with a security function as well as a function as a meter. In recent years, gas meter is requested to follow a change in a flow rate in a short interval (less than a second, 0.2 sec for instance) thus to enhance security function. However, with a conventional flow rate measuring device as in above, the flow velocity is averaged for relatively a long period of time (2 sec., for instance) then is converted into a flow rate, so a change in a momentary flow rate is not detectable.

SUMMARY OF THE INVENTION

This invention aims to provide a flow rate measuring device capable of detecting a change in momentary flow rates without sacrificing a primary function of averaging a flow velocity.

As demonstrated above, the invention includes a first transducer and a second transducer placed in a fluid flow path in which a fluid passes through each for transmitting and receiving an ultrasonic wave signal, and a timing part for measuring a propagation time of the ultrasonic signal transmitted between the first transducer and the second transducer. The invention also includes a timing controller for executing a unit measurement process. In the unit measurement process, a timing part measures a propagation time of the ultrasonic wave signal in a forward direction and a reverse direction while switching transmitting and receiving direction of the ultrasonic wave in a forward direction and in a reverse direction. In the forward direction the first transducer transmits the ultrasonic signal and the second transducer receives the signal, and in the reverse direction the second transducer transmits an ultrasonic signal and the first transducer receives the signal. The invention further includes a time differential memory part for storing a propagation time differential every K times the unit measurement process is executed. The propagation time differential is a differential between a propagation time of the ultrasonic wave signal in the forward direction and in the reverse direction which is measured in the unit measuring process. The invention still includes a flow rate calculating part for calculating a flow rate of the fluid passing inside the flow path, the calculation is based on a sum total of the propagation time in the forward direction and a sum total of that in the reverse direction which are obtained at least every 5 times execution of the unit measurement process. The device still further includes an estimating part for estimating a change in a momentary flow rate of the fluid based on the propagation time differentials obtained every K times execution of the unit measurement process and stored in the time differential memory part.

Accordingly, the flow rate calculating part obtains an accurate flow rate which is averaged over relatively a long period of time. On the other hand, the estimating part estimates a momentary flow rate by using measurements obtained by thinning the repeated unit measurement processes. Thus, the device obtains the accurate flow rate from averaged flow velocities, therewith detecting a change in the momentary flow rates.

DETAILED DESCRIPTION OF PREFERRED EMBODIMENTS

First Exemplary Embodiment

Figure 1:
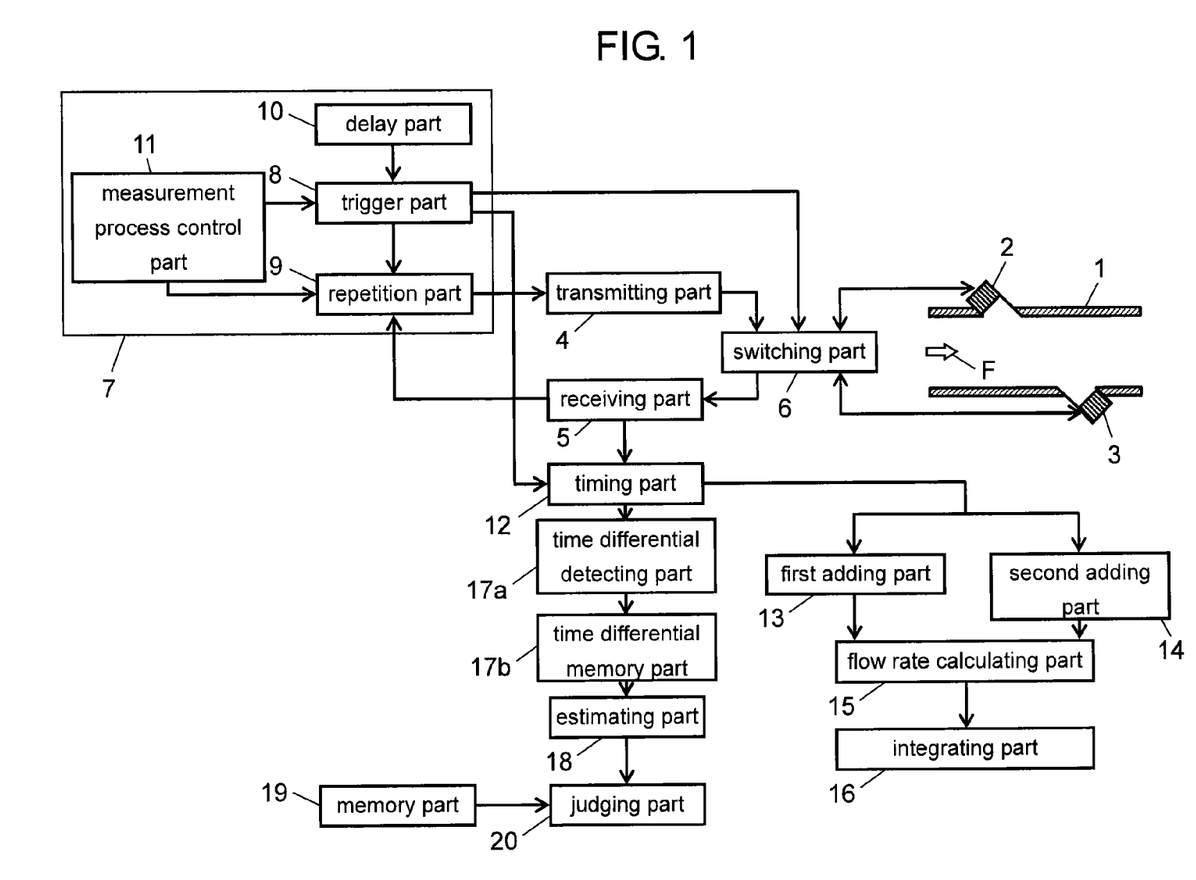
FIG. 1 is a block diagram showing of a flow rate measuring device in accordance with a preferred embodiment of the invention.

FIG. 1 is a block diagram of a flow rate measuring device according to preferred exemplary embodiment 1. First transducer 2 transmitting and receiving an ultrasonic wave signal and second transducer 3 also receiving and transmitting an ultrasonic wave signal are placed in a middle of fluid path 1, opposing flow direction F. Transmitting part 4 outputs a driving signal to first transducer 2. When first transducer 2 transmits an ultrasonic wave signal driven by the driving signal, second transducer 3 receives the signal. The signal received by second transducer 3 is processed by receiving part 5. Switching part 6 alternately switches a transmitting and a receiving function of first transducer 2 and second transducer 3.

Timing controller 7 controls overall transmission and reception performed by two transducers 2 and 3, and which is composed of trigger part 8, repetition part 9, delay part 10, and measurement process control part 11.

When trigger part 8 outputs a trigger signal instructing a start up of measurement, switching part 6 connects first transducer 2 to transmitting part 4 and second transducer 3 to receiving part 5. Measurement starts with first transducer 2 working as a transmitter and second transducer 3 as a receiver. This process is called a "flow measurement in forward direction" hereinafter. When transmitting part 4 outputs the driving signal, first transducer 2 outputs an ultrasonic wave signal. When the signal reaches second transducer 3, receiving part 5 starts a receiving process. Once the receiving process starts, repetition part 9 operates repeating the flow measurement in the forward direction by a number of prescribed sing around times. In this preferred embodiment, the sing around time is 4, but the number of the times is not limited to 4 or to any other plural numbers either, it may be 1. When 4 times of repetition is completed, delay part 10 emits a prescribed delay signal. Then trigger part 8 outputs a signal to switching part 6 for switching the direction of transmission and reception. Then, second transducer 3 is connected to transmitting part 4 and first transducer 2 to receiving part 5, starting measurement with second transducer 3 working as a transmitter and first transducer 2 as a receiver. Hereinafter, this process is called a "flow measurement in reverse direction". At this time, trigger part 8 outputs a trigger signal instructing a start of the measurement, then 4 times of repeated flow measurement starts in the reverse direction where the transmitting and the receiving functions are switched.

A series of the flow measurement in the forward direction (4 times of sing around) and in the reverse direction (4 times of sing around) is called a "unit measurement process". First conducted unit measurement process is a first measurement process. When the first measurement process is completed, delay part 10 outputs a delay signal, repeating a similar process to the first measurement, which is called a second measurement process. When measurement process control part 11 finishes a prescribed number of unit measurements, flow rate calculation starts.

Timing part 12 measures a time period required from an output of the trigger signal by trigger part 8 till an end of sing around. First adding part 13 adds up the time period measured by measuring part 12 in the forward direction of each unit measurement process. Second adding part 14 adds up a time period measured by measuring part 12 in the reverse direction. When the unit measurement process is completed by a prescribed time N (in the preferred embodiment N=100, but the number is not limited to this number), flow rate calculating part 15 calculates a flow rate based on the output value from first adding part 13 and second adding part 14. Since first adding part 13 and second adding part 14 each stores a total propagation time in the forward direction and in the reverse direction for executing N cycles of unit measurement process, an average propagation time in each direction per cycle is obtained by dividing the total propagation time by (4×N). Assume the value in the forward and in the reverse direction is respectively t1 and t2, then an average flow velocity is obtained by using formula (3). By multiplying the average flow velocity by a cross section S of fluid flow path 1, an average flow rate is obtained. By multiplying the time passed after the previous flow rate calculation, a passed flow amount is obtained. By adding up the passed flow amount by integrating part 16, an accumulated flow amount is obtained.

Time differential detecting part 17a conducts a calculation of a propagation time differential by properly thinning the N times of measurements. When making calculating by thinning every 5 times for instance, a propagation time differential in the first measurement process is obtained first, in which a differential between a time required for conducting 4 times of sing around in the forward direction and a time required for conducting 4 times of sing around in the reverse direction is defined to be the propagation time differential. The propagation time differential obtained by time differential detecting part 17a is stored in time differential memory part 17b. Then, a propagation time differential between the forward and reverse direction in the sixth measurement process is obtained. Time differential memory part 17b continues storing the propagation time differentials obtained by the thinned calculation with reference to a time the calculation was made.

Estimating part 18 converts the propagation time differential value calculated by time differential detecting part 17a or a constant-multiple of it into an estimated momentary flow rate of the fluid and output the value, which will be explained later.

Memory part 19 stores several unique time-series changing pattern output by estimating part 18. Judging part 20 judges whether the time-series changing pattern of the estimated flow rate output by estimating part 18 matches any of the pattern stored in memory part 19.

Figure 2:
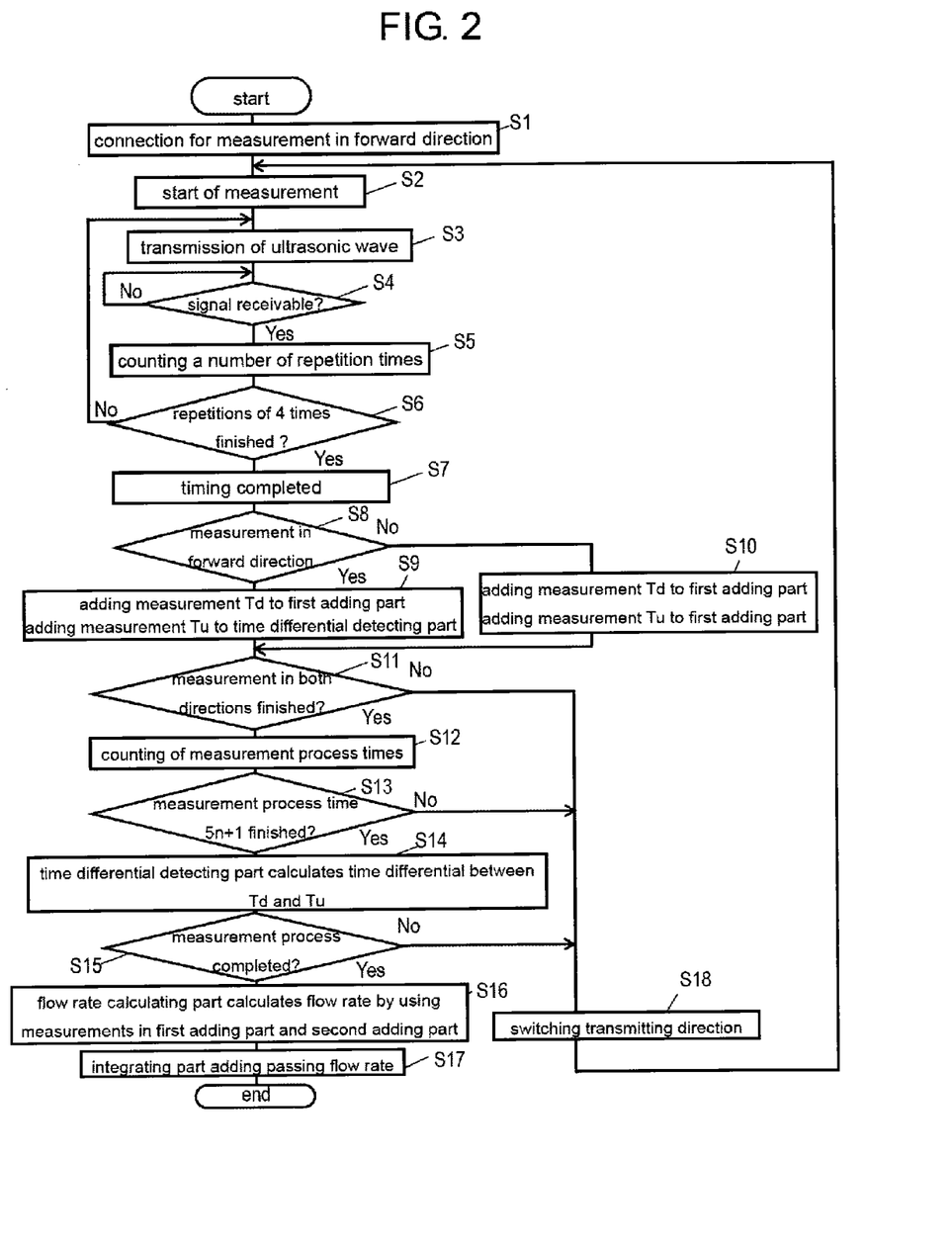
FIG. 2 is an operational flow chart of the flow rate measuring device according to the preferred embodiment.
Figure 3:
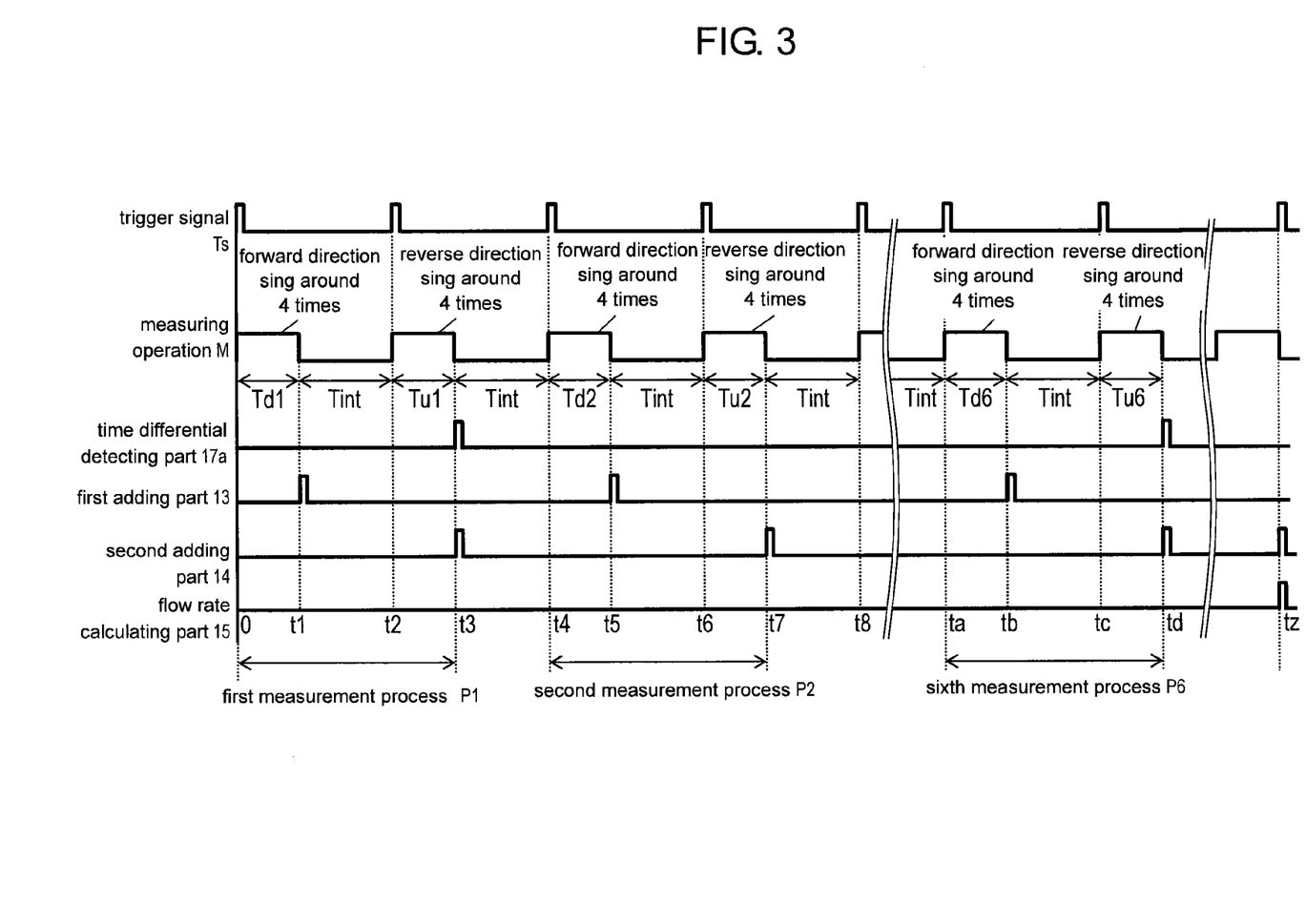
FIG. 3 is a time chart explaining the operation of the device.

Next, an operational flow of mentioned parts are explained with reference to FIGS. 2 and 3. FIG. 2 is a flow chart explaining operation of the device of the preferred embodiment. FIG. 3 is a time chart showing the operation of the device. In FIG. 3, an output timing of trigger part 8 showing a start of measurement in forward direction of the first measurement process is an origin of the chart. Horizontal axis indicates a time elapsed from the origin and a horizontal axis shows on-going operation of each part.

First, when trigger part 8 outputs trigger signal Ts for starting measurement, switching part 6 connects first transducer 2 to transmitting part 4 and second transducer 3 to receiving part 5, making a connection to start measurement in a forward direction. (step S1) Then, timing part 12 starts measuring operation M with first transducer 2 serving as a transmitter and second transducer 3 serving as a receiver. (step S2) In the process, timing part 12 starts measuring by making timing it received trigger signal Ts from trigger part 8 a beginning point of the measurement. In the preferred embodiment, as aforementioned, when first transducer 2 acts as a transmitter and second transducer 3 acts as a receiver it is called a measurement in a forward direction, and when first transducer 2 acts as a receiver and second transducer 3 as a transmitter it is called a measurement in a reverse direction.

When step S2 starts, transmitter side transducer 2 transmits an ultrasonic wave signal (step S3), and receiver side transducer 3 determines whether it can receive the ultrasonic signal. (step S4) Step 4 continues until the receiving transducer 3 receives the ultrasonic signal transmitted by transmitting transducer 2. (No in step S4)

In Step S4, if receiver side transducer 3 detects that it has received the ultrasonic wave signal (Yes in step S4), repetition part 9 counts the number of repetition times of transducer 2 transmitted the ultrasonic wave and transducer 3 received the signal. (step S5) Repetition part 9 determines whether the count has reached a prescribed number of times. (In the explanation of preferred embodiment, prescribed number is assumed to be 4, but the number is not necessarily limited to 4). (step S6) Repetition part 9 continues repeating the step S3 to S6 until it recognizes that the count has reached the prescribed number. (No in step S6)

In step S6, when repetition part 9 recognizes that the number of count reached the prescribed number (Yes in step S6), it initializes the count (to zero), and timing part 12 finishes measuring operation M at timing t1 in FIG. 3, for instance. (step S7)

Next, repetition part 9 judges whether the measurement step S3 to S6 has been made in the forward direction. (step S8) If it judges the measurement has certainly been conducted in the forward direction (Yes in step S8), timing part 12 outputs measurement Td to time differential detecting part 17a. First adding part 13 then adds up measurement Td accumulatively. (step S9)

After step S9, measurement process control part 11 judges whether the measurement step S3 to S6 has been taken in a reverse direction as well as in the forward direction. (step S11) If it finds that the measurement is not yet completed in both the forward the reverse directions (No in step S11), delay part 10 generates a prescribed delay time Tint. Switching part 6 then connects first transducer 2 to the receiving side and second transducer 3 to the transmitting side. (step S18). Trigger part 8 sends out trigger signal Ts to timing part 12 at timing t2 in FIG. 3. Then the process returns to Step S2.

In Step S8, if it judged that measurement step S3 to S6 has been taken for the reverse direction (No in step S8), timing part 12 outputs measurement Tu to time differential detecting part 17a, and second adding part 14 adds up measurement Tu accumulatively. (step S10)

In Step S11, if judgment is made that measurement step S3 to S6 has been taken for both in the forward and the reverse directions (Yes in step S11), the number of the measurement process time is counted. (step S12) The measurement process is referred to be "first measurement process P1", "second measurement process P2" and so on shown in FIG. 3.

Measurement process control part 11 judges whether the number of the measurement process times has reached a prescribed number (5n+1, for instance, where n is a positive integer). (step S13) When measurement process control part 11 judges that the process time is reached the prescribed number of times (Yes in step S13), time differential detecting part 17a calculates time differential Tdif. For instance, at timing t3 in FIG. 3, time differential detecting part 17a calculates time differential Tdif between measurements Td and Tu memorized in time differential detecting part 17a by using formula (5). Time differential Tdif is stored in time differential memory part 17b. (step S14)

$$Tdif = Tu - Td \quad (5)$$

If the measurement process times has not been reached the prescribed number, (No in step S13), there is no need to calculate the time differential, so the measurements Td and Tu stored in time differential detecting part 17a are initialized. Thus arranged, time differential memory part 17b stores time differential Tdif's obtained every 5n measurement process so that a time-series changes of the values obtained every measurement process is clearly understood. (n is a positive integer) As soon as the calculation in step S14 is completed, measurements Td and Tu memorized in time differential detecting part 17a are initialized.

After step S14, measurement process control part 11 judges whether the number of measurement process times has reached a full prescribed number (100 times in the preferred embodiment, but the number is not restricted to this number) (step S15) If it is judged that the measuring times has not yet reached the full prescribed number, (No in step S15), step from S18 and forward begins. In step S15, if it is judged that the measurement process times is reached the full prescribed number (Yes in step S15), flow rate calculating part 15 calculates a passing flow rate by using the values stored in first adding part 13 and second adding part 14. (step S16) The passing flow rate calculated by flow rate calculating part 15 is added into integrating part 16. (step S17)

As explained in step S14, with the preferred embodiment, Tdif the propagation time differential between the forward direction and the reverse direction is obtained every 5 measurement processes. Estimating part 18 estimates a momentary flow rate by using the propagation time differential Tdif.

That concludes the operational process according to the preferred embodiment. The process in FIG. 2 shall be repeated periodically.

Assuming a time for one time sing around is about 250 μs, then measurements Tu (Tu is defined to be a general term of individual value Tu1, Tu2, Tu3 and so on) and Td (Td is a general term of individual value Td1, Td2, Td3 and so on) in FIG. 3 are respectively about 1 ms. Assuming delay time Tint for switching a measuring direction is 4 ms, time required for one measurement process is 6 ms. Since delay time Tint (4 ms) is put every measurement process, making a total execution time of the unit measurement process 10 ms, if time differential detecting part 17a is operated every 5 measurement process, propagation time differential Tdif is detected every 50 ms.

The passing flow rate and the accumulated flow rate are calculated every 100 times of the measurement process (requiring about 1 sec).

Following, a method of estimating a momentary flow rate by using propagation time differential Tdif is explained.

Assuming propagation time differential at measurement process n is Tdifn, Tdifn is obtained by using formula (1) and (2), as is expressed in formula (6).

$$T\text{dif}n = 4(t2-t1) = 4L/(C+v\cos\theta) - 4L/(C-v\cos\theta) = 8Lv\cos\theta/(C^2+v^2\cos^2\theta) \quad (6)$$

Generally, the ultrasonic wave type flow rate measuring device is used where C>>v. So, formula (6) can be transformed into formula (7).

$$T\text{dif}n = 8Lv\cos\theta/C^2 \quad (7)$$

It is known that the acoustic sound velocity C changes with a change in temperature. However, since a change in fluid temperature in a very short lapse of time less than 1 sec is very small, the denominator in formula (7) may be considered a constant value. Propagation time differential Tdifn is therefore considered to be proportional to a flow velocity, therefore to a flow rate. Namely, obtaining a change in propagation time differential Tdifn is identical to obtaining a change in a flow rate. Thus, propagation time differential value Tdifn or its constant-multiplied value is treated as an estimated momentary flow rate of the fluid. When an accurate change in a flow rate is needed, the flow rate has to be calculated from formula (3), and then a change in the flow rate needs to be calculated. However, as long as a relative change in flow rate is needed, estimating from a propagation time differential between the time in forward direction and time in reverse directions does not generate a great deviation.

By estimating a change in flow rate from a change in the time differential, computation becomes less complicated than obtaining an accurate flow rate by using formula (3). Especially, for a home use gas meter or a water meter which requires a continuous operation for a long time (10 years, for instance), reduction in an amount of calculation (especially of multiplication and division times) greatly contributes to a reduction in power consumption. It is also of a great help when a momentary detection of a change in a flow rate requested.

Figure 4:
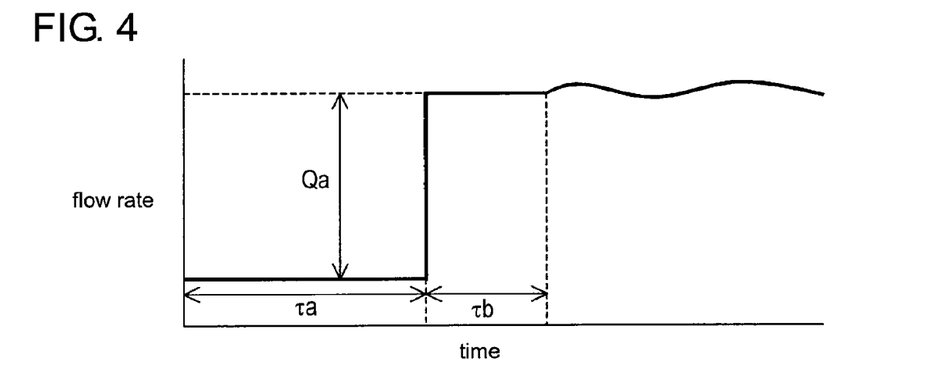
FIG. 4 is a graphical demonstration showing a flow rate changing pattern stored in a memory part of the device.
Figure 5:
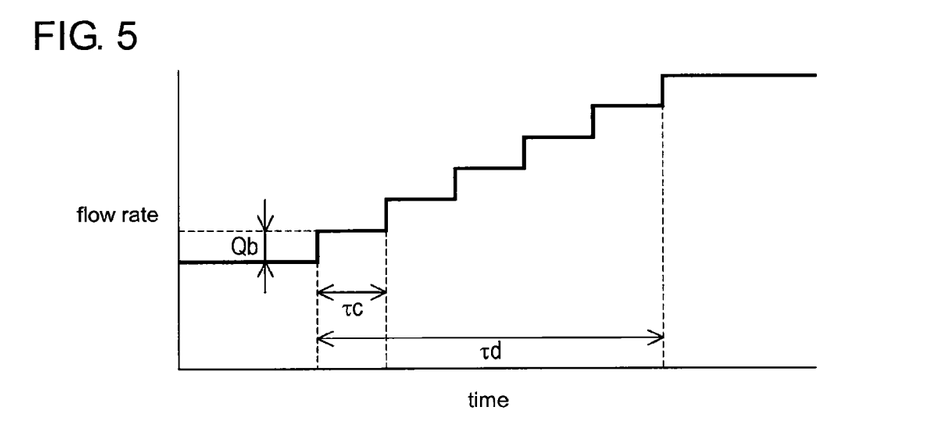
FIG. 5 is a graphical demonstration showing another flow rate changing pattern stored in the memory part of the device.
Figure 6:
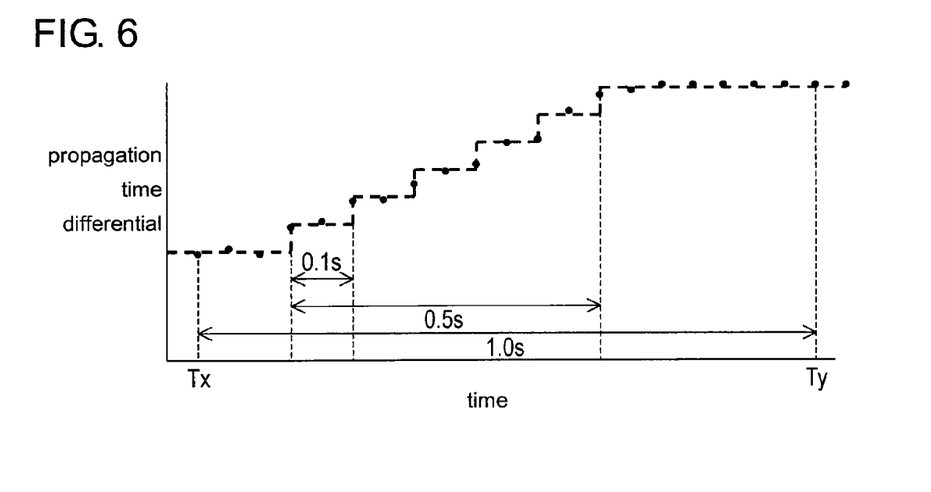
FIG. 6 is a time chart explaining an operation of a judging part of the device.

Next, an explanation is made on how estimating part 18 estimates a momentary flow rate by using propagation time differential Tdiffn is made as well as an explanation on an operation of memory part 19 and judging part 20. Reference is made to FIGS. 4, 5 and 6. FIGS. 4 and 5 are examples of flow rate changing pattern stored in memory part 19. FIG. 4 is pattern 1 of the changing flow rate. In pattern 1, an almost fixed flow rate continues for a certain period of time ra, then the flow rate abruptly rises by Qa1/h and the level Qa1/h continues for a certain period of time rb. Herein, memory part 19 stores flow rate continuation time period ra, rb and a changing flow rate Qa with certain latitude. The latitude is given so that time period ra and rb, and changing flow rate Qa may be determined with some allowance.

FIG. 5 is pattern 2 of the change in the flow rates. In pattern 2, the flow rate changes in stages by a certain amount Qb1/h every certain period of time rc. Memory part 19 stores time period rc, changing flow rate Qb, and time period rd in which the change in the flow rates continues in steps, with some latitude. The latitude is given for allowing some allowance when determining time period rc, changing flow rate Qb and continuation time period rd.

FIG. 6 is an example of a time-series data of a estimated momentary flow rate output by estimating part 18. In FIG. 6, propagation time differential is changed every 0.1 sec as indicated by black dots. Judging part 20 compares data shown by the dots in FIG. 6 and patters 1 and 2 stored in memory part 19, and determines to which pattern the data is closer. With the exemplary embodiment, time period 0.1 sec in each step and the changing value the propagation time differential in each step in FIG. 6 look close to pattern 2 stored in memory part 19. Judging part determines if time period 0.1 sec and the changing value in each step in FIG. 6 match the time period rc and changing flow rate Qb in pattern 2, and if continuation time period in steps 0.5 sec matches continuation time period rd in pattern 2. If judging part 20 judges that both is in agreement, determination is made that the dots line in FIG. 6 appeared in pattern 2. Here, the flow rate such as Qa and Qb are considered to be stored as a propagation time differential in reference to formula (7).

If calculation of propagation time differential is made every 50 ms by detecting part 17a as in FIG. 6, since continuation time period rd is 0.5 sec (500 ms) long, the calculation cycle (50 ms) by detecting part 17a is sufficiently shorter than the continuation time period rd (500 ms), so it is easy to detect the propagation time differential. On the other hand, if flow rate calculating part 15 sets a flow rate calculation timing at Tx and Ty and calculates the flow rate every 1 sec, the flow rate obtained at Ty becomes simply an averaged value of momentary flow rates between the time period of Tx and Ty, so a change in steps less than 1 sec is not recognized in this way.

Determination of conformity by judging part 20 may not have to be made every 50 ms (in the preferred embodiment, every 5 measurement process). For instance, a group of data may be stored in every proper timing (every 10 sec, for instance) may be stored in a memory (not illustrated) as a bundle of data, and then every changing amount of the stored data may be followed for judgment.

As a changing pattern of flow rate, an output change estimated at a time of failure of first transducer 2 and second transducer 3 may be stored in memory part 19, which may be utilized for a failure analysis.

As an other way of utilizing memory part 19, a flow rate changing pattern seen at a startup of a particular gas appliance may be stored in memory part 19. This case, the flow rate measuring device of the invention is used as a home gas meter. The particular gas appliance being attached to a downstream, the device recognizes a beginning of use of the gas appliance and an operational status thereof, utilizing the information for maintaining security.

As demonstrated above, the invention includes a first transducer and a second transducer placed in a fluid flow path in which a fluid passes through each for transmitting and receiving an ultrasonic wave signal, and a timing part for measuring a propagation time of the ultrasonic signal transmitted between the first transducer and the second transducer. The invention also includes a timing controller for executing a unit measurement process. In the unit measurement process, a timing part measures a propagation time of the ultrasonic wave signal in a forward direction and a reverse direction with the switching part switching transmitting and receiving direction of the ultrasonic wave in a forward direction and in a reverse direction. In the forward direction the first transducer transmits the ultrasonic signal and the second transducer receives the signal, and in the reverse direction the second transducer transmits an ultrasonic signal and the first transducer receives the signal. The invention further includes a time differential memory part for storing a time differential every K times the unit measurement process is executed. The propagation time differential is a differential between a propagation time of the ultrasonic wave signal in the forward direction and in the reverse direction which is measured in the unit measuring process. The invention still includes a flow rate calculating part for calculating a flow rate of the fluid passing inside the flow path, the calculation is based on a sum total of the propagation time in the forward direction and a sum total of that in the reverse direction which are obtained at least every K times execution of the unit measurement process. The device still further includes an estimating part for estimating a change in a momentary flow rate of the fluid based on the propagation time differentials obtained every K times execution of the unit measurement process and stored in the time differential memory part.

Accordingly, the device obtains an accurate flow rate by a way of averaging the flow velocities, therewith determines a change in the momentary flow rates.

In the invention, the flow rate calculating part is also structured to calculate a flow rate of a passing fluid in the flow path based on a sum total of the propagation time differentials measured in the forward direction and a sum total of the propagation time differentials in the reverse direction obtained every K×A times execution (A is a natural number) of the unit measurement process. So, the invention may also determine a flow rate of passing fluid every K×A times of unit measurement process.

The invention still more includes a memory part for storing at least one typical time-series changing pattern of momentary flow rates, as well as a judging part for comparing the typical pattern stored in the memory part with the change of time difference estimated by the estimating part and determining whether the change in the momentary flow rates matches the typical pattern.

With above arrangement, the invention recognizes a characteristic changing pattern of the flow rates, which may be utilized in determining a usage status of the fluid.

The device of the invention may be installed in a gas supply line connecting a gas supply source and a gas appliance. The memory part stores at least one changing pattern of a gas flow rate of a particular appliance when it is in use. When the change of time difference estimated by the estimating part and the changing pattern of the gas flow rate of the particular appliance in the memory part match, the judging part determines that the particular gas appliance is used in a downstream of the supply source. Thus, the device makes an appropriate discrimination of a particular gas appliance being used.

INDUSTRIAL APPLICABILITY

The gas flow rate measuring device of the invention is enabled to obtain an accurate passing flow rate. The device is usable as a gas meter identifying a gas appliance in use.

REFERENCE MARKS IN THE DRAWINGS

1 fluid flow path
2 first transducer
3 second transducer
4 transmitting part
5 receiving part
6 switching part
7 timing controller
8 trigger part
9 repetition part
10 delay part
11 measurement process control part
12 timing part
13 first adding part
14 second adding part
15 flow rate calculating part
16 integrating part
17a time differential detecting part
17b time differential memory part
18 estimating part
19 memory part
20 judging part

The invention claimed is:

1. A flow rate measuring device comprising:
a first transducer and a second transducer for transmitting and receiving an ultrasonic wave signal and being placed in a flow path inside which a fluid passing through;
a timing part for measuring a propagation time of the ultrasonic wave signal transmitted between the first transducer and the second transducer;
a timing controller for executing a unit measurement process, in which the timing part measures the propagation time of the ultrasonic wave signals in the forward direction from the first transducer to the second transducer and the reverse direction from the second transducer to the first transducer by switching a transmitting direction of the ultrasonic wave signal to the forward direction or the reverse direction;
a time differential memory part for storing a time differential between the propagation time of the ultrasonic wave signals in the forward direction and the propagation time in the reverse direction measured every K times execution of the unit measurement process;
a flow rate calculating part for calculating a flow rate of the fluid passing through inside the flow path based on a sum total of the propagation time in the forward direction and a sum total of the propagation time in the reverse direction obtained after at least K times execution of the unit measurement process; and an estimating part for estimating a change in the momentary flow rates of the fluid based on the time differentials obtained every K times execution of the unit measurement process and stored in the time differential memory part.

2. The flow rate measuring device of claim 1,
wherein the flow rate calculating part calculates the flow rate of the fluid passing through inside the flow path based on the sum total of the propagation time in the forward direction and the sum total of the propagation time in the reverse direction obtained after at least K×A times execution (A is a natural number) of the unit measurement process.

3. The flow rate measuring device of claim 1 further comprising:
a memory part for storing at least one typical pattern of a time-series change in the momentary flow rates; and
a judging part for comparing the typical pattern stored in the memory part with the change in the time differentials estimated by the estimating part and judging whether the change in the time differentials matches the typical pattern.

4. The flow rate measuring device of claim 3,
wherein the device is installed in a gas supply line connecting a gas supply source and a gas appliance,
wherein the memory part stores at least one pattern of the change in flow rates of a particular gas appliance when it is in use, and
wherein, the judging part determines that the particular gas appliance is in use at a downstream of the supply line as the part judges that the change in the time differentials estimated by the estimating part matches the pattern of the change in the flow rates of the particular gas appliance.

* * * * *